Figure 1:
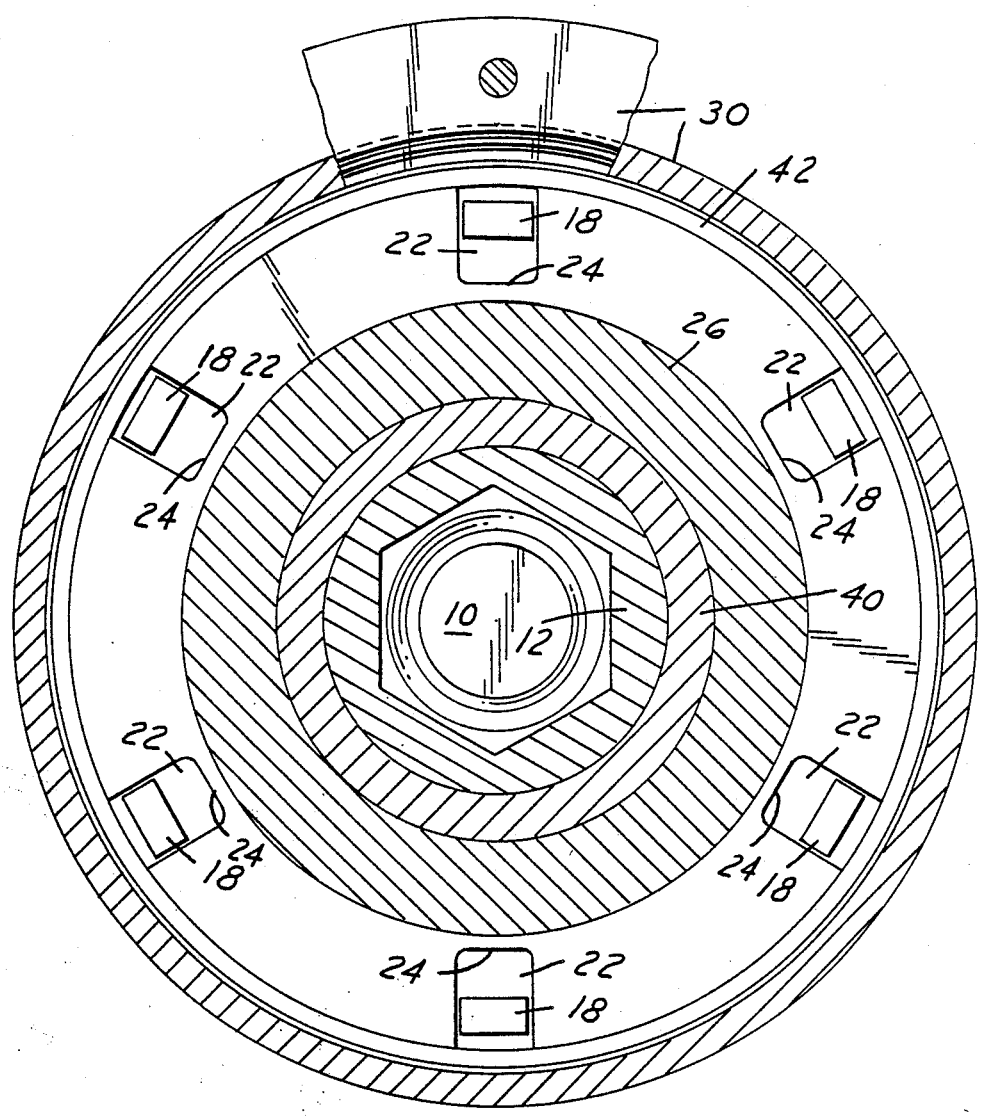

United States Patent [19]

Diehl et al.

[11] Patent Number: 4,917,225

[45] Date of Patent: Apr. 17, 1990

[54] THERMALLY ENGAGED CENTRIFUGAL CLUTCH

[75] Inventors: Roy E. Diehl, Northville; Alvin H. Berger, Brownstone, both of Mich.

[73] Assignee: Ford Motor Company, Dearborn, Mich.

[21] Appl. No.: 253,825

[22] Filed: Oct. 5, 1988

[51] Int. Cl.⁴ .................. F16D 43/04; F16D 43/25
[52] U.S. Cl. .................. 192/82 T; 192/83; 192/104 C
[58] Field of Search .......... 192/82 T, 83, 104 C, 192/79

[56] References Cited

U.S. PATENT DOCUMENTS

| | | | |
|---|---|---|---|
| 2,655,015 | 10/1953 | Linder . | |
| 2,840,315 | 6/1958 | Heiss | 236/35 |
| 2,924,083 | 2/1960 | Spase | 192/82 T |
| 2,983,123 | 5/1961 | Spase | 192/104 C X |
| 3,105,580 | 10/1963 | Settimi | 192/82 T |
| 3,730,151 | 5/1973 | Smith et al. | 123/41.12 |
| 3,751,941 | 8/1973 | Stiff | 192/82 T X |
| 3,903,712 | 9/1975 | Richter et al. | 192/82 T X |
| 4,412,605 | 11/1983 | Deem et al. | 192/83 X |
| 4,471,861 | 9/1984 | McIntosh | 192/83 X |

Primary Examiner—Rodney H. Bonck
Attorney, Agent, or Firm—Jerome R. Drouillard; Clifford L. Sadler

[57] ABSTRACT

An automotive type internal combustion engine driven accessory is connected to the engine crankshaft by a thermal and centrifugally responsive clutch mechanism that includes a centrifugally responsive ring responsive to higher engine speeds to provide slippage between the clutch parts to maintain the accessory drive at a predetermined maximum RPM, that speed level being increased in response to an excessive generation of heat due to the slippage to effect a greater engagement of the clutch and less slippage and therefore a reduction in the amount of heat generated.

7 Claims, 2 Drawing Sheets

THERMALLY ENGAGED CENTRIFUGAL CLUTCH

This invention relates in general to an automotive type centrifugal clutch for engaging and disengaging an accessory from the engine drive pulley. More particularly, it relates to one in which the accessory is driven at essentially a constant speed by slipping the clutch, to reduce noise, with thermal override means, however, to reduce the slippage in the event excessive heating is generated as a result of the slippage.

Centrifugally engaged and/or thermally engaged clutch units re known. For example, Settimi, U.S. Pat. No. 3,105,580, shows the use of a thermally responsive element to cause engagement of a fan above a predetermined temperature, with centrifugal force being used to complete the engagement.

Heiss, U.S. Pat. No. 2,840,315, uses a spring with weak fingers pressing against a clutch plate to provide a slip engagement at low temperatures, a thermostatic unit pushing the fingers into full engagement at higher temperatures.

Linder, U.S. Pat. No. 2,655,115, describes and shows in FIGS. 2 and 3 interengaging clutch plates controlled by a member having a different coefficient of expansion than the surrounding member, for separating the clutch plates in response to temperature rise to prevent damage to the device.

Smith et al, U.S. Pat. No. 3,730,151, describes the use of a clutch engaged by Nickel-Titanide springs which are opposed by steel springs. At low temperatures, the steel springs overpower the NiTi springs to disengage the clutch, while at the higher temperature levels, the NiTi springs overpower the steel springs.

From the above, it will be noted that none of the prior art, alone or in combination, shows a thermally responsive centrifugal clutch unit wherein once a predetermined speed level is reached, as represented by the torque level imposed, slippage occurs between the members to maintain that particular speed level; however, if the heat generated by the slippage rises to or above a desired level, a thermostatically responsive member decreases the slippage between the members, i.e., tends to lock-up the clutch, to reduce the heat generated and thereby protect the system.

It is a primary object of the invention, therefore, to provide a centrifugal clutch of the slipping type to reduce noise by establishing a predetermined maximum RPM level of the accessory to be driven, together with a thermally responsive element that will override the degree of slippage between the members in response to a predetermined temperature rise to the heat generated to vary the set speed to thereby reduce the temperature.

Figure 2:
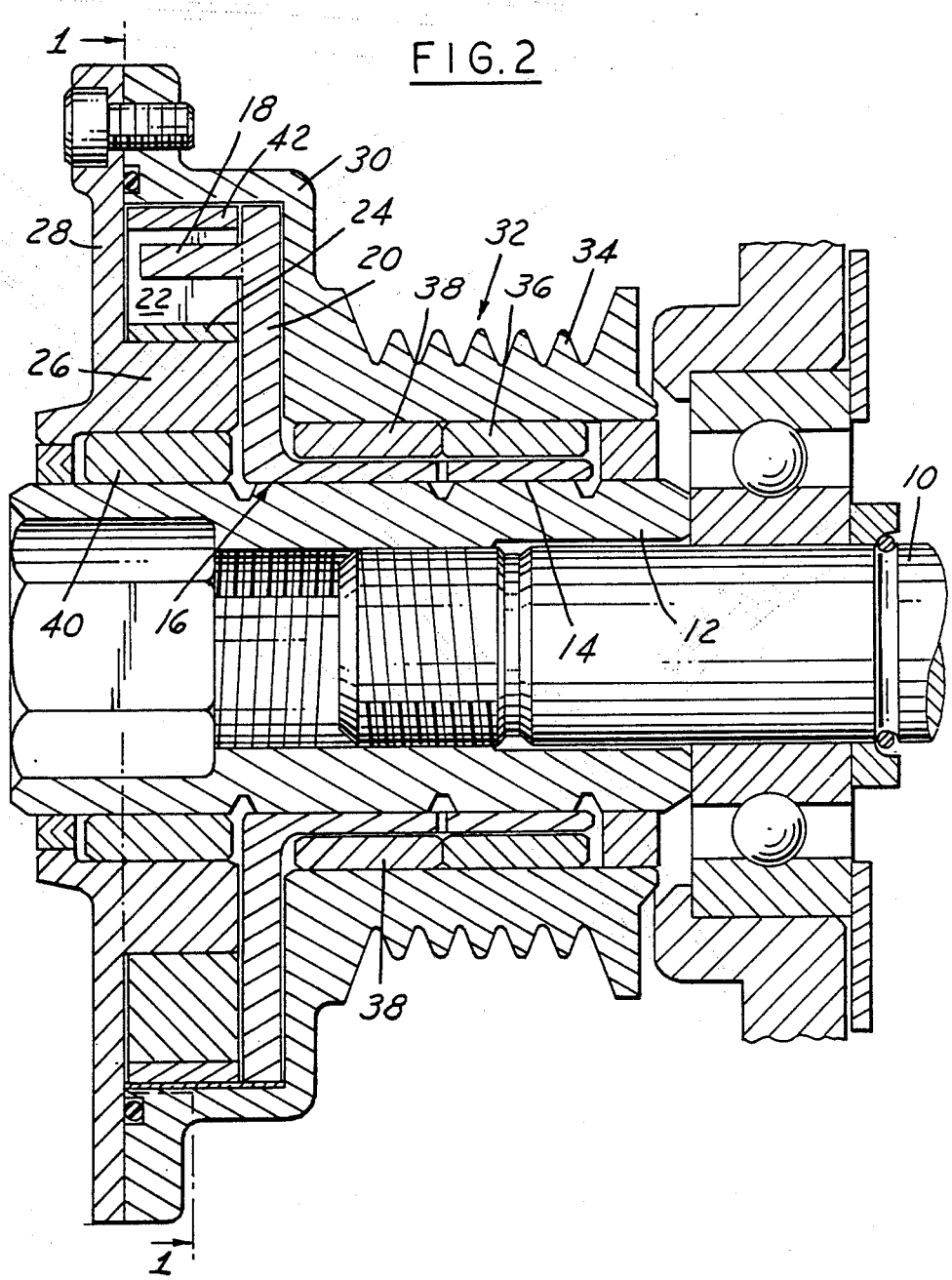

Other objects, features and advantages of the invention will become more apparent upon reference to the succeeding detailed description thereof, and to the drawings illustrating the preferred embodiment thereof, wherein:

FIG. 1 is a cross-sectional view of one-half of an accessory drive device embodying the invention taken along line 1—1 of FIG. 2; and FIG. 2 is a cross-sectional view partially broken away, of the accessory drive device shown in FIG. 1.

This invention is applied in this case specifically to the clutch drive of an engine alternator to normally not go beyond a predetermined RPM, to reduce noise, although it will be clear as the description proceeds that it will have equal applicability for the drive of other engine accessories, as well.

To assure adequate generating capacity at engine idle speeds, alternators generally are driven at several times crankshaft speed. At high engine speeds, however, the alternator turns much faster than is necessary for maximum generating capacity. Therefore, it would be desirable to limit the alternator's maximum speed to reduce the noise produced by the alternator's cooling fan.

The invention to be described provides for such a speed limiter. A thermally engaged centrifugal clutch is built into the alternator's drive pulley to limit the alternator's maximum speed. The centrifugal clutch is engaged at low alternator speed and disengages at high alternator speed. When the drive pulley's speed exceeds the clutch disengagement speed, the clutch slips, keeping the alternator running at the clutch disengagement speed. If the clutch has slipped for an extended period of time, the friction energy creates heat energy in the clutch. To protect the clutch from excessive temperature, a thermal engagement feature is incorporated into the design. As clutch temperature increases, the thermal engagement feature causes the disengagement speed to also increase, thereby reducing the amount of heat produced by the slippage and thus limiting the clutch's maximum temperature.

Turning now to the drawings, FIG. 1 shows the thermally engaged centrifugal clutch as including, in this case, an alternator drive shaft 10 onto which is threaded a sleeve-type drive spindle 12. Mounted on the spindle 12 with a press fit is the hub 14 of a drive plate 16. The plate has a number of circumferentially spaced, horizontally extending lugs 18 projecting outwardly from an upstanding annular flange 20. The horizontal projections or lugs 18 are adapted to engage in a corresponding number of apertures 22 in a bronze expansion ring 24. The ring surrounds and overlays a step-like extension 26 of a steel drive pulley cover plate 28 bolted to an extension 30 of an engine driven drive pulley 32. The latter has the usual ridged hub 34 for cooperation with a drive belt, not shown, driven by the engine crankshaft at the appropriate multiple of crankshaft speed. Suitable bearings 36, 38 and 40 separate the drive pulley from the hub of the drive plate, as well as cover portion 26 from drive spindle 12.

FIG. 1 shows the bronze expansion ring 24 surrounded by a steel tension ring 42 nestled within the extension 30 of the drive pulley. The tension ring is of such a diameter that, at low engine speeds, it forces the expansion ring 24 radially inwardly into firm or non-slip engagement with the step 26 of the cover plate 28 so as to provide a drive between the two. Therefore, at low engine speeds, drive of the pulley 32 will cause a corresponding rotation of the alternator shaft 10 without slippage.

On the other hand, the bronze expansion ring 22 is subject to the effect of centrifugal forces acting thereon at higher engine speeds to expand radially outwardly away from the step portion 26 in a manner to provide a slipping frictional engagement between the two. Thus, as the engine speed increases, alternator 10 will be driven at the same speed until the centrifugal force acting on the expansion ring pulls the latter radially outwardly counter to the radially inwardly clamping force against the step-like extension 26 of the cover plate and, consequently, decreasing the torque transmitting capacity at the cover/expansion ring interface. When the alternator speed reaches the point where the clutch's torque transmitting capacity has been reduced to be equal to the torque required to drive the alternator shaft 10, the clutch begins to slip at the interface between the expansion ring and the cover plate. Any additional increase of the pulley speed, therefore, results in additional slipping at this point and not an increase in the speed of the alternator shaft 10. This limiting of alternator speed to a predetermined RPM level reduces the amount of noise generated by the alternator during intermittent high speed engine operation.

With sustained high speed engine operation, however, the heat generated by a continuously slipping clutch can accumulate sufficiently to an undesirable point. To prevent overheating, therefore, it is desirable to reduce or eliminate the slipping so as to reduce the elevation of clutch temperature.

Thermal control of the clutch in this case has been accomplished by fabricating the expansion ring 22 from bronze, as indicated previously, which has a 50% greater thermal expansion rate than the steel tension ring 42. As the slip clutch temperature increases, therefore, the bronze expansion ring 22 will grow in volume. Being restrained on its outside diameter by the steel tension ring 42, the bronze expansion ring exerts a greater radial load inwardly against its interface with the pulley cover portion 26. This increased radial load decreases the slippage between the cover portion and ring and increases the alternator speed at which the clutch begins to slip. This consequently reduces the heat generated in the clutch due to the slipping.

From the foregoing, therefore, it will be seen that the invention provides a thermally and centrifugally responsive clutch for connecting an alternator or other accessory type shaft to an engine driven pulley in a manner that the clutch mechanism is permitted to slip to maintain the alternator at a desired RPM level, to reduce noise, rather than at an increasing level as is evidenced by conventionally driven alternators. Furthermore, it will be seen that when the heat generated by the slippage of the clutch parts becomes excessively high, that the clutch parts are then reengaged to reduce the slippage and thus the amount of heat generated, and consequently the alternator shaft speed at which the clutch begins to slip is increased.

While the invention has been shown and described in its preferred embodiment, it will be clear to those skilled in the arts to which it pertains that many changes and modifications may be made thereto without departing from the scope of the invention. For example, the clutch could be incorporated into the crankshaft pulley, per se, to limit belt speed and to control all engine accessories with one clutch, without departing from the scope of the invention.

I claim:

1. A centrifugal clutch construction for the slip drive of an internal combustion engine accessory to reduce noise comprising, an accessory drive shaft, an engine driven drive pulley rotatably surrounding the shaft, an expansion ring normally clamped to the pulley for effecting a non-slip drive therebetween at low engine speeds, the ring expanding radially outwardly under the influence of centrifugal forces acting thereon at higher engine speeds to gradually reduce the non-slip drive to effect a slipping frictional heat generating engagement of the ring relative to the pulley, and means connecting the ring to the accessory shaft for driving the shaft during engagement of the ring with the pulley, the ring being constructed of a material having a higher thermal rate of expansion than that of the contiguous parts whereby the slipping of the ring generates frictional heat that increases as a function of time to effect a volumetric expansion of the ring against the pulley to thereby reduce the slipping and generation of heat.

2. A centrifugal clutch as in claim 1, further comprising a tension ring surrounding the expansion ring and forcing it radially inwardly at lower engine speeds.

3. A clutch as in claim 1, the pulley having a cover member secured thereto extending radially inwardly towards the shaft, the expansion ring surrounding a portion of the cover member radially outwardly thereof, whereby movement of the expansion ring radially outwardly from the cover member under the influence of centrifugal force progressively disengages the ring from the member.

4. A clutch as in claim 1, the expansion ring having at least one aperture therethrough, the means connecting the ring and shaft including finger-like projecting means extending from the shaft into the aperture for drive of the shaft by the ring.

5. A clutch as in claim 4, wherein the projecting means projects from a sleeve that is press fitted to the shaft for a unitary drive therebetween.

6. A centrifugal clutch construction for driving an internal combustion engine accessory in a slipping manner to reduce noise, comprising an accessory drive shaft, an engine driven drive pulley coaxially mounted with respect to the shaft and radially spaced therefrom and having a cover member secured thereto, the cover member extending radially inwardly towards the shaft and having a radially inner portion, a thermally and centrifugally responsive expansion ring having a higher thermal rate of volumetric expansion than the parts of the clutch contiguous thereto for effecting a radial expansion of the ring in response to temperature increases of the ring above a predetermined level, the ring being centrifugally responsive at higher engine speeds to expand radially outwardly, the ring being mounted around the cover inner portion to be engaged at times therewith, a second ring preloaded in tension surrounding the expansion ring in a manner to force the expansion ring radially inwardly into driven engagement with the cover inner portion in response to centrifugal forces below a predetermined level acting thereon to be driven by the cover portion, and a sleeve fixed to the shaft and having projections extending into engagement with the expansion ring to be driven thereby for driving the shaft from the pulley, rotation of the pulley at the higher engine speeds subjecting the expansion ring to centrifugal forces sufficient to move the latter ring radially outwardly from the cover part to effect a slipping frictional drive therebetween with a resultant generation of heat, an increase in the heat level effecting a thermal volumetric expansion of the expansion ring radially inwardly against the cover inner portion sufficient to decrease the slippage between the expansion ring and inner part and thereby reduce the generation of heat.

7. A clutch as in claim 6, the expansion ring having a plurality of apertures spaced circumferentially therein for the reception therein of an equal number of the sleeve projections.

* * * * *